A. PLAGMAN.
POWER TRANSMITTING APPARATUS.
APPLICATION FILED JUNE 1, 1911. RENEWED APR. 15, 1912.
1,026,998.
Patented May 21, 1912.
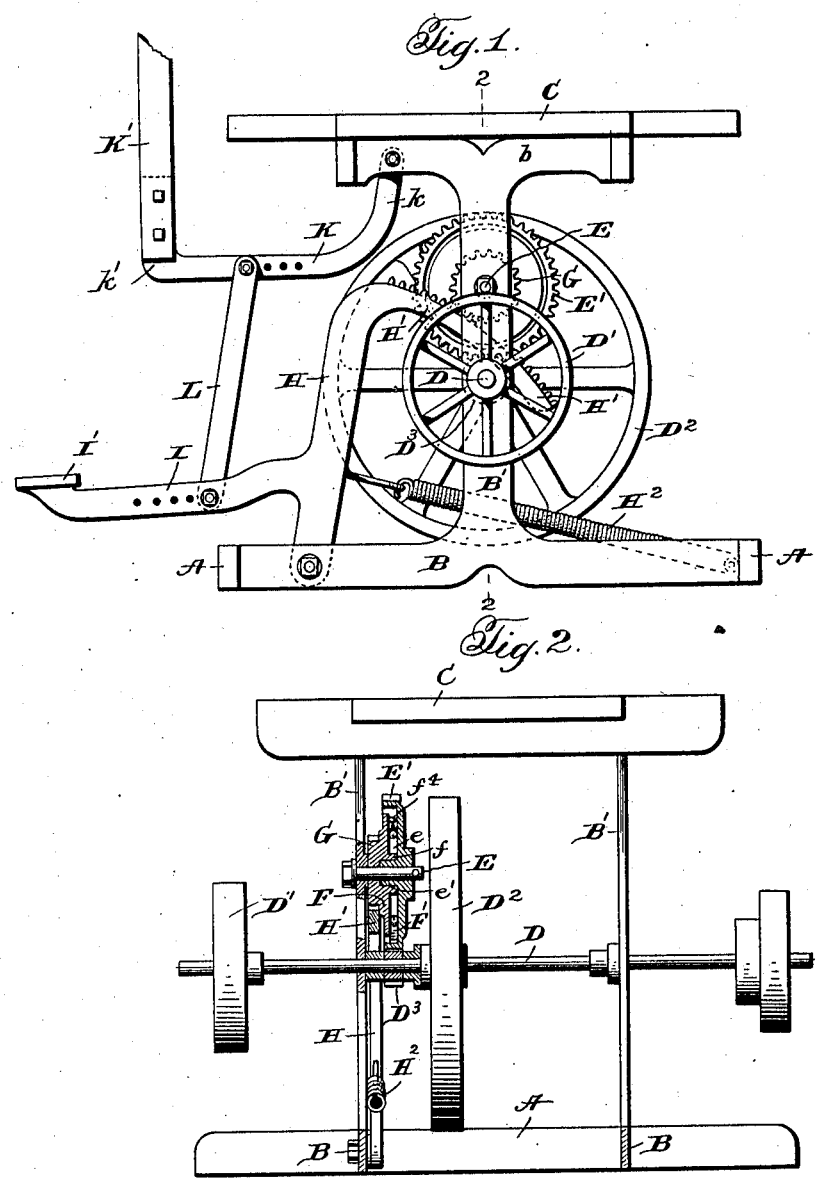

UNITED STATES PATENT OFFICE.

ADOLPH PLAGMAN, OF DAVENPORT, IOWA.

POWER-TRANSMITTING APPARATUS.

1,026,998. Specification of Letters Patent. Patented May 21, 1912.

Application filed June 1, 1911, Serial No. 630,700. Renewed April 15, 1912. Serial No. 691,004.

*To all whom it may concern:*

Be it known that I, ADOLPH PLAGMAN, a citizen of the United States, residing at Davenport, in the county of Scott and State of Iowa, have invented certain new and useful Improvements in Power-Transmitting Apparatus, of which the following is a specification.

This invention relates to an improvement in power transmission devices and more particularly to a device of this character which is especially adapted for transmitting power to light machinery, such as lathes, jig saws, washing machines and the like.

The object of the invention is the provision of a simple and efficient power transmission device of this character which may be operated either by hand or foot power or by both hand and foot power.

Further objects of the invention will be apparent from the detailed description hereinafter when read in connection with the accompanying drawings, wherein a convenient embodiment of the invention is illustrated and wherein like characters of reference refer to similar parts in the several views.

In the drawings:—Figure 1 is a side elevation of the improved power transmission device; Fig. 2 is a cross section on line 2—2 of Fig. 1, and Fig. 3 is a detailed view of the clutch pinion.

Referring now more particularly to the drawings, the parts of the power transmission device are carried by a stand which comprises connected parallel base members A A, the ends of which are connected by cross pieces B B, from the central portions of which extend vertical uprights B' B', the upper ends of which are provided with transversely extending portions $b$ which are bolted or otherwise rigidly secured to the underside of a table C, which constitutes the support for the machinery which is to be driven.

Journaled in suitable bearings formed in the uprights B' B' is a transversely extending shaft D, the end of which projects at one side of the supporting stand of the device and has keyed or otherwise rigidly secured thereon a pulley D' from which the power from the shaft D may be transmitted by a suitable belt to the shaft of the machine which is intended to be driven. The other end of the shaft D may also, if desired, be extended beyond the other side of the stand and provided with a similar driving pulley, so that the device may be used to transmit power to two or more machines.

Keyed or otherwise rigidly secured to the shaft D intermediate the vertical standards B' B' of the stand is a fly wheel $D^2$ and keyed to the shaft alongside of said fly wheel is a small pinion $D^3$.

Projecting laterally from one of the vertical standards B' directly above the shaft D is a stub shaft E upon which is mounted a large pinion E' which meshes with the small pinion $D^3$ carried by the shaft D. The pinion E' is spaced from the standard B' from which the shaft E projects and the face of said pinion adjacent said standard is provided with an annular depression $e$ therein and with a boss $e'$ positioned centrally of said depression.

F designates a circular clutch plate which is of a size to fit within the circular depression $e$ in the side of the gear wheel E, said clutch plate being provided with a central opening fitting over the boss $e'$ of the gear wheel E. The clutch plate F is provided on its inner surface with an oval shaped boss $f$ surrounding the central opening therein, the ends of which boss are provided with recesses $f'$ therein. Lying upon the inner face of the clutch disk F are a pair of clutch dogs F', each of which is angular in shape and is provided at the angular portion thereof with a nib or projection $f^2$ which is adapted to loosely fit in one of the depressions $f'$ in the end of the boss $f$ projecting from the clutch plate. One arm of each of the dogs F' projects outwardly beyond the periphery of the clutch disk F and is provided with a foot $f^3$ which is adapted, when the dogs F' are rocked by movement of the clutch plate in one direction, to frictionally engage the wall of the circular depression $e$ in the side of the pinion E' so as to cause such pinion to rotate with the clutch plate. Rocking movement of the dogs F' on the clutch plate is limited by means of suitable studs or projections $f^4$ which project from the inner face of said clutch plate and lie on opposite sides of the arms of said dogs.

G designates a small pinion which is loosely mounted on the shaft E and is rotatable with the clutch plate F. The pinion G may be made separate from the clutch plate F and bolted to the exterior thereof or the pinion and clutch may be made integral if desired.

From the above description it will be apparent that when the pinion G is rotated in one direction, the large pinion E' will rotate therewith and will, through its connection with a pinion D³ rotate the shaft D, but that the pinion G may be rotated in a reverse direction independent of the pinion E'.

Pivotally secured at its lower end in any suitable manner to one of the cross bars B of the supporting stand is an upwardly extending arm or lever H from the upper end of which extends a rearwardly curved rack bar H' which underlies the small pinion G mounted on the shaft E and is in mesh therewith, so that as the lever H is swung on its pivot, the pinion G will be rotated.

Projecting forwardly from the lower end of the arm or lever H is an arm I which is provided at its forward end with a foot piece or treadle I'. The arm or lever H, the curved rack H', and the arm I are conveniently cast together, although if desired, these parts may be made separate.

H² designates a coil spring, one end of which is secured to the lever or arm H adjacent the lower end thereof and the other end of which is connected in any suitable manner to the rear portion of the stand or frame of the device. The coil spring H² tends to normally draw the lever H rearwardly.

K designates a horizontally disposed lever which underlies the table C of the stand and is provided at its rear end with an upturned portion $k$ which is pivotally connected in any suitable manner to one of the transversely extending portions $b$ of the supporting standards B' of the stand. The forward end of the lever K projects beyond the front of the table C and terminates in an upwardly extending portion $k'$ to which is rigidly connected an upwardly extending hand operating lever K'. A link L is pivotally connected at its upper end to the horizontally disposed lever K intermediate the ends thereof and at its lower end to the arm I which projects forwardly from the lower end of the lever H. The horizontally disposed lever K and the arm I are preferably provided with a series of openings therein through which the pivot bolts which connect the link L therewith are adapted to pass so that the point of connection of such link with the lever K and the arm I may be adjusted to suit the operator.

From the above description it will be seen that the device may be operated either by the hand lever K', or the treadle or foot piece I', or by both the hand lever and treadle, as the operator may desire.

While a convenient embodiment of the invention is illustrated in the accompanying drawings, it will be understood that many changes may be made to the form and construction therein shown without departing from the spirit and scope of the invention as defined in the appended claims.

What I claim is:

1. In a device of the character described, a stand comprising a supporting base, standards extending upwardly therefrom, a power shaft journaled in such standards, a shaft mounted in said stand above said power shaft, a pinion on the power shaft, a pair of pinions on said other shaft, one of said pinions meshing with the pinion on the power shaft, clutch mechanism between said pair of pinions, an upwardly extending lever fulcrumed at its lower end to the supporting base of said stand and provided at its upper end with a curved rack bar meshing with the free pinion on the shaft above the power shaft, said lever being provided with an actuating arm extending laterally from the lower end thereof.

2. In a device of the character described, a stand comprising a supporting base, and a table supported thereby, a power transmitting shaft journaled in said stand, and means for transmitting power to said shaft including a pinion rotatably mounted in the stand, a lever pivotally connected at its lower end to the supporting base of said stand and provided at its upper end with a curved rack bar meshing with said pinion, a laterally extending arm rigidly connected to said lever and provided at its free end with a foot piece, a hand lever provided with a horizontally extending portion underlying the table and pivotally connected at its free end to the upper portion of said stand, and a link pivotally connecting the horizontally extending portion of said hand lever and the laterally extending arm of said first mentioned lever.

3. In a device of the character described, a stand comprising a supporting base, a table supported thereby, a power transmitting shaft journaled in said stand, and means for rotating said shaft including a pinion loosely mounted in said stand, a lever pivotally supported at its lower end to the supporting base of said stand and provided at its upper end with a rearwardly extending curved rack meshing with said pinion and at its lower end with a forwardly extending arm rigid therewith, a foot piece carried by said forwardly extending arm, a hand lever fulcrumed to the stand, and a connection between said hand lever and the forwardly extending arm of said first mentioned lever.

4. In a device of the character described, a stand comprising a supporting base, a pair of uprights extending therefrom and a table supported by the upper end of said uprights, a power transmitting shaft journaled in the uprights of said stand, a shaft extending from one of the uprights of said stand and positioned above said power transmission shaft, a pinion loosely mounted on said shaft, gearing for actuating said power shaft when said pinion is rotated in one direction, a lever pivotally supported at its lower end to the supporting base of said stand and provided at its upper end with a rearwardly extending curved rack bar meshing with said pinion, and at its lower end with a forwardly extending arm rigid therewith, a foot piece carried by said forwardly extending arm, a hand lever provided at its lower end with a horizontally extending portion underlying the table, and provided at its free end with an upturned portion pivotally connected to the upper portion of the stand, and a link pivotally connecting the horizontally extending portion of said hand lever and the forwardly extending arm of said first mentioned lever.

In testimony whereof I affix my signature in presence of two witnesses.

ADOLPH PLAGMAN.

Witnesses:
J. E. CRAWFORD,
G. E. LAU.

Copies of this patent may be obtained for five cents each, by addressing the "Commissioner of Patents, Washington, D. C."